P. P. PAYNE.
TANK.
APPLICATION FILED FEB. 21, 1918.
1,363,992.
Patented Dec. 28, 1920.
2 SHEETS—SHEET 1.
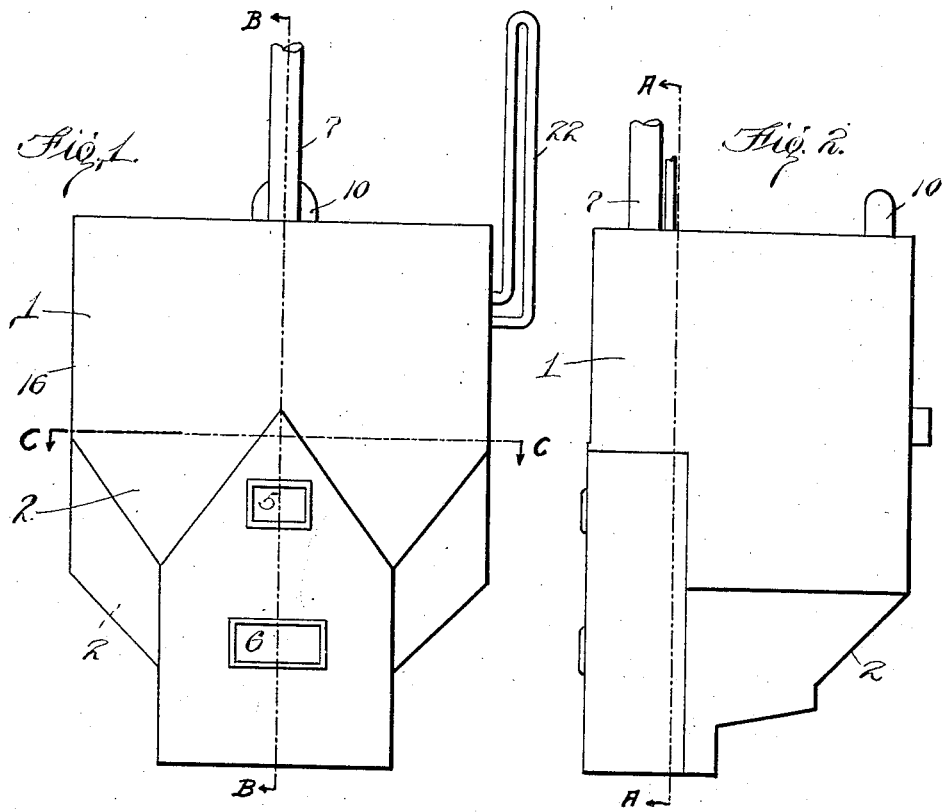
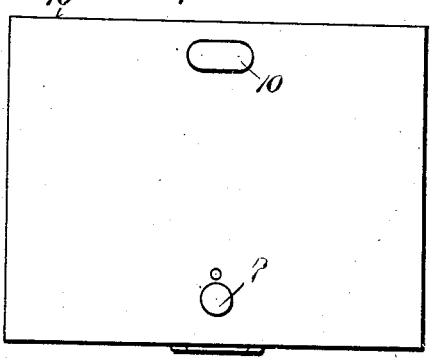
witness
Elwin Quinney
Eva B. Stevenson
Pearl Penelope Payne P. P. PAYNE.
TANK.
APPLICATION FILED FEB. 21, 1918.
1,363,992.
Patented Dec. 28, 1920.
2 SHEETS—SHEET 2.
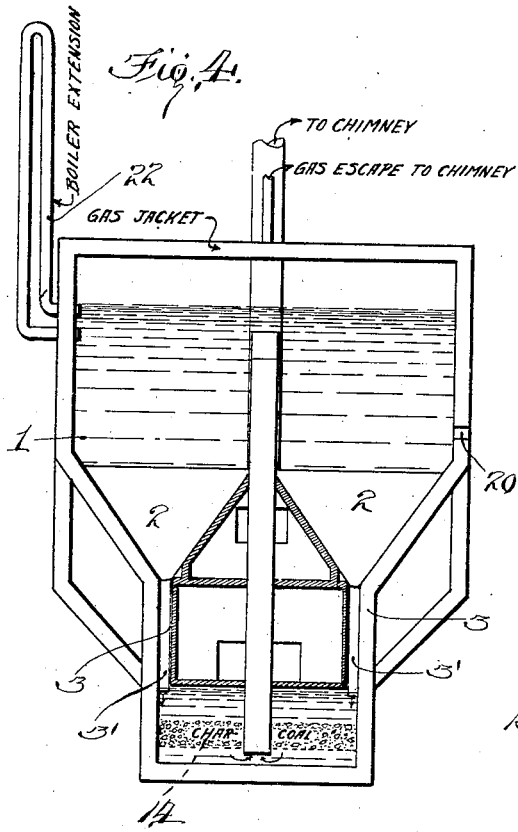
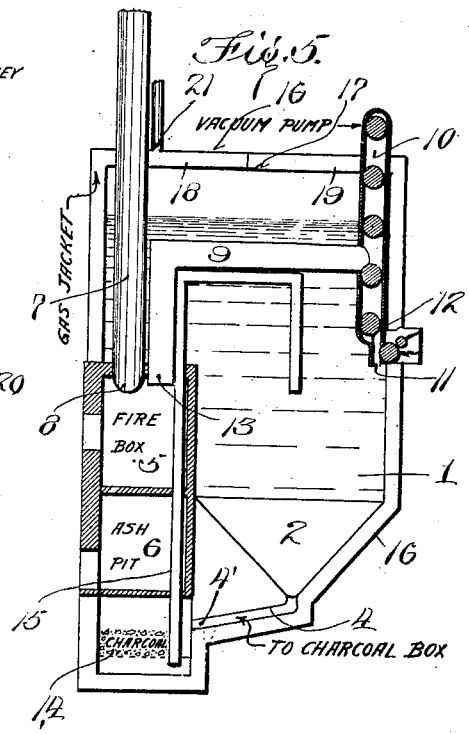
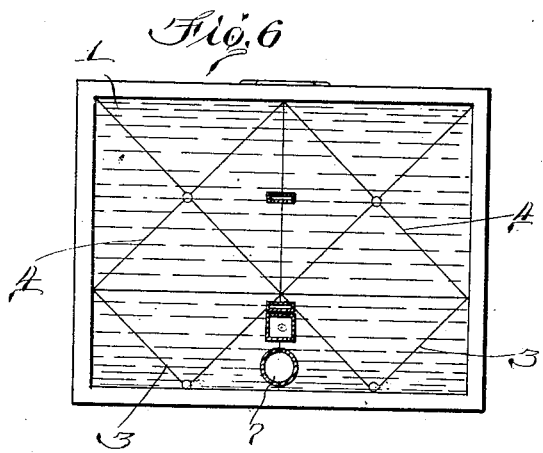

UNITED STATES PATENT OFFICE.

PEARL PENELOPE PAYNE, OF PIERRE, SOUTH DAKOTA.

TANK.

1,363,992.   Specification of Letters Patent.   Patented Dec. 28, 1920.

Application filed February 21, 1918. Serial No. 218,607.

*To all whom it may concern:*

Be it known that I, PEARL P. PAYNE, a citizen of the United States, residing at Pierre, in the county of Hughes and State of South Dakota, have invented certain new and useful Improvements in Tanks; and I do hereby declare the following to be a full, clear, and exact description of the invention, such as will enable others skilled in the art to which it appertains to make and use the same.

This invention contemplates certain new and useful improvements in smoke consuming apparatus.

The principal object of my invention is the production of an apparatus for treating the products of combustion from a furnace by consuming the dirt and soot contained therein, and extracting the heat therefrom for purposes of radiation.

Another object of my invention is to produce an apparatus for extracting the soot and heat from products of combustion by directing them into a body of water containing a solution of lime, and subsequently causing the circulation of said water through a bed of charcoal for purposes of purification.

A further object of the invention is the production of a smoke heating apparatus which can be successfully used in connection with an ordinary heating system thereby causing a saving in fuel.

With these and other objects in view, the invention further consists in the combination and arrangement of the several parts hereinafter described and pointed out in the appended claims.

In the drawings, which are partly diagrammatic, of my improved apparatus,

Figure 1 is a front elevation of my improved apparatus.

Fig. 2 is a side elevation thereof.

Fig. 3 is a top plan view.

Fig. 4 is a transverse vertical sectional view on the line A—A of Fig. 2.

Fig. 5 is a longitudinal vertical sectional view on the line B—B of Fig. 1, and

Fig. 6 is a horizontal sectional view on the line C—C, of Fig. 1.

The present invention comprises among other things a tank or reservoir; means including a vacuum pump for delivering the products of combustion to the contents of said tank; means for collecting the saturated contents, directing them to a bed of charcoal and returning the purified liquid to the tank; an encircling jacket for said tank adapted to confine the gases produced about the tank for purposes of retaining the heat therein; and a connection from the interior of said tank with the boiler of a heating system whereby preheated water may be delivered to the heating system.

Referring to the drawings, in which similar reference characters designate corresponding parts, the tank or reservoir 1 comprises a body portion having a series of funnel-shaped outlets 2 through which the saturated liquid passes to the purifying means. The purpose of these funnel-shaped or inverted pyramid outlets is to insure the ready discharge of the saturated material, thereby preventing the clogging or massing thereof.

The front pair of funnel-shaped outlets 2 communicate with the charcoal bed hereinafter to be described, by means of the pipes 3, see Fig. 4, while the rear pair of outlets 2 communicate with said charcoal bed through the pipes 4, see Fig. 5. Valves 3' and 4' may be provided in their respective pipes.

At the front of the apparatus and between the front pair of outlets 2, a firebox 5 is provided, having an ashpit 6 as shown. Extending from the firebox is a chimney 7 having a valve 8 provided therein for preventing the escape of the products of combustion when said products are to be treated, and the smoke and heat extracted.

Leading from the firebox 5 is a conduit 9 adapted to convey the products of combustion from the firebox to a vacuum pump 10, which may be of any desired and improved type.

The products of combustion are drawn and forced by the pump into the liquid contents of the tank at a point well below the top level of said liquid. The point at which the said products leave the pump is indicated at 11 in the drawings, and is preferably controlled by means of a valve 12.

A valve 13 is also provided in the conduit 9 for preventing the entrance of the products of combustion when they are not to be treated.

The means for purifying the saturated content of the tank includes a charcoal bed 14 located beneath the ashpit. This charcoal bed can be removed and fresh charcoal inserted, as will be readily understood.

The communicating pipes 3 and 4 hereinbefore referred to lead to this charcoal bed and deliver the soot and dirt saturated content of the tank thereto, where after circulating therethrough, it is directed upward through the conduit 15 and returned to the tank.

The conduit 15 extends directly through the firebox and by virtue of heat produces the necessary circulation to return the purified liquid to the reservoir. The return of this liquid is at a point well below the level of the contents of said tank.

Surrounding the apparatus is a jacket 16 the purpose of which is to receive the heated gases evolved from the saturated content of the tank. These gases rise through the water and pass through a check valve 17 into respective chambers 18 and 19 of the jacket 16. These chambers are in communication through an opening 20 for permitting the full circulation of the gases within the jacket. A valve-controlled outlet 21 is provided in said jacket, and is preferably connected with the chimney 7 to permit the escape of the gases. This valve is pressure-controlled and acts only as a relief valve when the gases within the jacket become so intensive as to jeopardize the safety of the apparatus. A coating of asbestos may be applied around the jacket 16 to further assist in retaining the heat.

The heat extracted from the products of combustion I prefer to use in connection with a heating system, and as shown the connecting pipe 22 communicating with the liquid contents of the tank is adapted to be connected with the boiler of any heating system (not shown). By this arrangement the water used in the heating system is given a preliminary heating, and as a consequence assists in the reduction of the amount of fuel consumed. In the extracting of the heat and the consumption of the smoke, I use water into which lime has been put. Certain chemical reactions occur, as will now be described.

In practice, the tank or reservoir 1 is filled with water to about the level shown, after which a quantity of lime is placed therein. The carbonic acid gas in the smoke and products of combustion will unite with the water, forming carbonic acid. The lime which has been put into the water will unite with it, forming calcium hydrate. Now, the calcium hydrate and carbonic acid will act upon each other, forming calcium carbonate.

Likewise, the sulfur dioxid in the smoke will unite with the water forming sulfuric acid, and the sulfuric acid will unite with the calcium hydrate, forming calcium sulfate. Calcium carbonate and calcium sulfate are not soluble in the solutions in the tank and will fall as a white powder to the bottom of the tank. Likewise the carbon or soot in the smoke will not be affected and will tend to fall to the bottom of the tank. Through the funnel-shaped outlets 2 the saturated contents will be carried by gravity to the charcoal box. By the action of the charcoal in purifying the content, the carbon, calcium carbonate and calcium sulfate will be removed. After the purification the liquid content will rise in the conduit 15 and circulate as hereinbefore mentioned to the tank. The heat in the conduit 15 is sufficient to boil the contents and cause it to overflow carrying pure water back into the tank.

The gases from the products of combustion produced in the tank will bubble upwardly through the liquid content, heating it as they rise, and together with the steam and vapor rising from the water will pass into the jacket 16 through the valve 17, and circulate around the apparatus through the communicating chambers 18 and 19. Should the pressure become too great in the jacket 16, the valve-controlled outlet 21 will operate as a safety attachment.

By the peculiar arrangement of funnel-shaped outlets, it will be seen that any solids floating in the water in the tank will not collect or deposit thereon.

The apparatus has many uses to which it may be applied as an auxiliary heating element, and I do not limit myself to the exact disclosure made herein. Also, various changes in the arrangement, size, and construction of the several parts may be resorted to without departing from the spirit of my invention.

I claim:

1. An apparatus of the class described comprising a tank containing a liquid content, a firebox, means for conveying the products of combustion from said firebox to the content of said tank, means for purifying the resultant saturated content, means for returning the purified portion of said content to the tank, and means for collecting heated gases from said liquid content and confining them about the apparatus.

2. An apparatus of the class described comprising a tank containing a liquid content, a firebox, means including a valve-controlled conduit in said liquid content for conveying the products of combustion, a vacuum pump for delivering said products of combustion from the conduit to the liquid content at a point beneath the level of said liquid; a bed of charcoal for purifying the resultant saturated content, means including a conduit extending through the firebox for conveying the purified portion of the saturated content to the tank and discharging same therein at a point beneath the level of the liquid contained therein; and a hollow jacket encircling said apparatus for collecting the heated gases escaping from the liquid content in the tank.

3. An apparatus of the class described comprising a tank containing a liquid content, a firebox, means for conveying products of combustion to said liquid content, means for purifying the resultant saturated content and returning the purified portion to the tank, means for collecting the escaping gases from said liquid content in the tank and confining them about the apparatus, and a connection extending from the liquid content in the tank to a heating system for establishing circulating connection therewith.

4. An apparatus of the class described comprising a tank containing liquid, a firebox, a vacuum pump for delivering products of combustion to the liquid content in said tank, a charcoal bed for purifying the resultant saturated content, means including a plurality of funnel-shaped outlets for conveying said saturated content to the bed of charcoal, and means including a heated conduit extending from said charcoal bed to a point beneath the level of the liquid content for returning the purified portion of the saturated content to the tank.

5. An apparatus of the class described comprising a tank containing a liquid content, a firebox, a vacuum pump for delivering the products of combustion to the liquid content in said tank, means including charcoal for purifying said resultant saturated content, means for returning the purified portion of said saturated content to the tank, means including a hollow jacket surrounding the apparatus for collecting and confining heated gases escaping from said liquid content, and a valve for relieving said heated gases should the pressure in said jacket become too great.

6. The method of consuming the smoke from products of combustion which consists in treating the same in a solution of lime and water, and purifying the resultant saturated content by means of charcoal.

7. The method of extracting heat and consuming smoke from the products of combustion which consists in subjecting the same to a solution of lime and water, purifying the resultant saturated content by means of charcoal, and producing a heated gas from the saturated solution of lime and water.

In testimony whereof I affix my signature, in presence of two subscribing witnesses.

PEARL PENELOPE PAYNE.

Witnesses:
ELWIN QUINNEY,
EVA B. STEVENSEN.